United States Patent
Zhou et al.

(10) Patent No.: US 11,928,993 B2
(45) Date of Patent: Mar. 12, 2024

(54) DISPLAY DEVICE AND DISPLAY METHOD THEREFOR

(71) Applicant: BOE Technology Group Co., Ltd., Beijing (CN)

(72) Inventors: Chunmiao Zhou, Beijing (CN); Kuanjun Peng, Beijing (CN); Tao Hong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/038,433

(22) PCT Filed: Nov. 30, 2020

(86) PCT No.: PCT/CN2020/132891
§ 371 (c)(1),
(2) Date: May 23, 2023

(87) PCT Pub. No.: WO2022/110191
PCT Pub. Date: Jun. 2, 2022

(65) Prior Publication Data
US 2024/0005824 A1    Jan. 4, 2024

(51) Int. Cl.
*G09G 3/00* (2006.01)
*G02B 27/00* (2006.01)
(Continued)

(52) U.S. Cl.
CPC ......... *G09G 3/003* (2013.01); *G02B 27/0093* (2013.01); *G02B 30/33* (2020.01);
(Continued)

(58) Field of Classification Search
USPC ....................................................... 345/156
See application file for complete search history.

(56) References Cited

U.S. PATENT DOCUMENTS

| 2005/0099688 A1 | 5/2005 | Uehara et al. |
| 2006/0012593 A1* | 1/2006 | Iriguchi ................. G09G 3/003 345/204 |

(Continued)

FOREIGN PATENT DOCUMENTS

| CN | 1614505 A | 5/2005 |
| CN | 106773033 A | 5/2017 |

(Continued)

OTHER PUBLICATIONS

PCT/CN2020/132891 international search report.

*Primary Examiner* — Chineyere D Wills-Burns
(74) *Attorney, Agent, or Firm* — IPro, PLLC

(57) ABSTRACT

A display device and a display method therefor. The display device includes: a display panel (10), including a base substrate (101) and a plurality of pixel islands (102) located on the base substrate (101), each of the pixel islands (102) including a plurality of sub-pixels (p) arranged in a first direction (x) and a second direction (y), in the pixel island (102), a row of sub-pixels (p) arranged in the first direction (x) having the same color, and a row of sub-pixels (p) arranged in the second direction (y) having mutually different colors; and a light splitting device (20) located at a display surface side of the display panel (10) and configured to deflect part of light emitted by the display panel (10) to a first region, and deflect the other part of light to a second region.

10 Claims, 8 Drawing Sheets

(51) Int. Cl.
 G02B 30/33 (2020.01)
 G06F 3/01 (2006.01)
(52) U.S. Cl.
 CPC ..... G06F 3/013 (2013.01); *G09G 2300/0452* (2013.01); *G09G 2320/0209* (2013.01); *G09G 2320/028* (2013.01); *G09G 2354/00* (2013.01)

(56) References Cited

U.S. PATENT DOCUMENTS

| | | | | |
|---|---|---|---|---|
| 2013/0121560 | A1* | 5/2013 | Hirai | G06V 40/167 382/154 |
| 2013/0155051 | A1* | 6/2013 | Shimoyama | H04N 13/373 345/419 |
| 2015/0301239 | A1* | 10/2015 | Xi | G02B 5/201 359/891 |
| 2017/0214900 | A1* | 7/2017 | Li | H04N 13/327 |
| 2019/0037210 | A1 | 1/2019 | Zhang et al. | |
| 2019/0058874 | A1* | 2/2019 | Kim | H04N 13/398 |
| 2019/0206951 | A1* | 7/2019 | Xin | H10K 71/00 |
| 2020/0043989 | A1* | 2/2020 | Liu | H10K 59/00 |
| 2021/0193763 | A1* | 6/2021 | Sun | H10K 50/858 |
| 2022/0163843 | A1* | 5/2022 | Li | G02F 1/133514 |
| 2022/0350207 | A1* | 11/2022 | Zhou | G02F 1/133512 |
| 2022/0394236 | A1* | 12/2022 | Gao | H04N 13/351 |

FOREIGN PATENT DOCUMENTS

| | | |
|---|---|---|
| CN | 107396087 A | 11/2017 |
| CN | 108174182 A | 6/2018 |
| CN | 111552093 A | 8/2020 |

* cited by examiner

DISPLAY DEVICE AND DISPLAY METHOD THEREFOR

CROSS-REFERENCE TO RELATED APPLICATIONS

The disclosure is a National Stage of International Application No. PCT/CN2020/132891, filed on Nov. 30, 2020, which is hereby incorporated by reference in their entireties.

FIELD

The present disclosure relates to the technical field of display, and in particular to a display device, and a display method therefor.

BACKGROUND

Based on binocular parallax, a naked-eye three-dimensional (3D) display technology can generate realistic and stereoscopic images having a sense of space and depth without any auxiliary tools (such as 3D glasses). Since the stereoscopic images feature realistic and vivid expression, superior environmental appeal and powerful visual impact, the naked-eye 3D display device has been applied to increasing domains.

In the related art, multi-viewpoint naked-eye 3D display is achievable with a 2D display panel and a light splitting device, presenting more realistic and stereoscopic images. However, multi-viewpoint naked-eye 3D display is liable to crosstalk in a viewing area.

SUMMARY

A display device provided in an embodiment of the present disclosure includes:
  a display panel including a substrate, and a plurality of pixel islands on the substrate; where each of the pixel islands includes a plurality of sub-pixels arranged in a first direction and a second direction; in each pixel island, a row of sub-pixels arranged in the first direction have the same color, and a row of sub-pixels arranged in the second direction have colors different from each other; and the first direction and the second direction intersect with each other; and
  a light splitting device at a side of a display surface of the display panel; where the light splitting device is configured to deflect part of light emitted by the display panel to a first region, and deflect the other part of light emitted by the display panel to a second region;
  where a main lobe angle corresponding to the pixel island in a central display region of the display panel and a pupil distance angle satisfy the following relational expression:

$$\alpha \geq \frac{2}{3} \cdot \beta;$$

where α represents the main lobe angle, and β represents the pupil distance angle; the main lobe angle is a projection angle of light emitted by the pixel island at a viewing position and in the first direction; and the pupil distance angle is an opening angle of two eyes relative to the display panel at the viewing position.
  Optionally, in the embodiment of the present disclosure, a main lobe angle corresponding to the pixel island in the central display region of the display panel and a pupil distance angle corresponding to the pixel islands in a central display region of the display panel satisfy the following relational expression:

$$\alpha \leq \frac{3}{2} \cdot \beta.$$

Optionally, in the embodiment of the present disclosure, the number of viewpoints corresponding to the pixel island satisfies the following relational expression:

$$\frac{2}{3} \cdot \frac{\beta}{\gamma} \leq n \leq \frac{3}{2} \cdot \frac{\beta}{\gamma}, \text{ and}$$

$$\gamma = 2 \cdot \arctan\left(\frac{d}{2 \cdot L} \cdot \frac{180}{\pi}\right);$$

where n represents the number of viewpoints, γ represents a viewpoint interval angle, and d represents a distance between adjacent viewpoints at the viewing position.
  Optionally, in the embodiment of the present disclosure, the display device further includes:
    an eye tracker configured to detect a position of an eyeball and send detected position information of the eyeball; and
    an image adjuster configured to receive the position information of the eyeball from the eye tracker, and switch image data of the sub-pixels in the display panel according to the received position information of the eyeball.
  Optionally, in the embodiment of the present disclosure, the display device further includes: a transparent optical film layer between the display panel and the light splitting device;
    where the transparent optical film layer has a thickness satisfying the following relational expression:

$$H = \frac{Px \cdot L}{T};$$

where H represents the thickness of the transparent optical film layer, Px represents a width of each sub-pixel in the first direction, L represents a distance between the viewing position and the light splitting device, and T represents a binocular pupil distance.
  Optionally, in the embodiment of the present disclosure, each of the pixel islands has a size satisfying the following relational expression:

$$D \leq L \cdot \tan\left(\frac{1}{60} \cdot \frac{\pi}{180}\right);$$

where D represents a width of the pixel island in the first direction.
  Optionally, in the embodiment of the present disclosure, the light splitting device is a barrier grating, a cylindrical lens or a liquid crystal grating.
  Correspondingly, an embodiment of the present disclosure further provides a display method for any one of the above display devices. Each of pixel islands in the display panel includes a plurality of sub-pixel groups, and each of the sub-pixel groups includes at least two sub-pixels adjacent in the first direction;

where the display method includes:
detecting position information of two eyes of a user; and
switching image data of the sub-pixels in the display panel according to the detected position information of the two eyes of the user, where the same image data is loaded into the sub-pixels in the sub-pixel group.

Correspondingly, an embodiment of the present disclosure further provides a display method for any one of the above display devices. The display method includes:
detecting position information of two eyes of a user; and
switching image data of sub-pixels in the display panel when it is detected that a position of an eyeball is beyond a corresponding movable region,
where the movable region satisfies the following relational expression:

$$\frac{1}{3} \cdot W \le J \le \frac{1}{2} \cdot W;$$

where J represents the movable region of the eyeball at the viewing position, and W represents a projection region of light emitted by the pixel island in the central display region of the display panel at the viewing position.

Optionally, in the embodiment of the present disclosure, the display method further includes:
loading some sub-pixels in the pixel island with image data corresponding to a left eye, loading some other sub-pixels in the pixel island with image data corresponding to a right eye, and loading the remaining sub-pixels in the pixel island with no image data.

DETAILED DESCRIPTION OF THE EMBODIMENTS

In view of the problem that multi-viewpoint naked-eye 3D display is prone to a crosstalk between viewing areas, embodiments of the present disclosure provide a display device and a display method therefor.

Specific implementation modes of the display device and the display method therefor according to the embodiments of the disclosure are described in detail below in combination with accompanying drawings. Sizes and shapes of components in the accompanying drawings do not reflect true scale, and are merely illustrative of the present disclosure.

Figure 1:
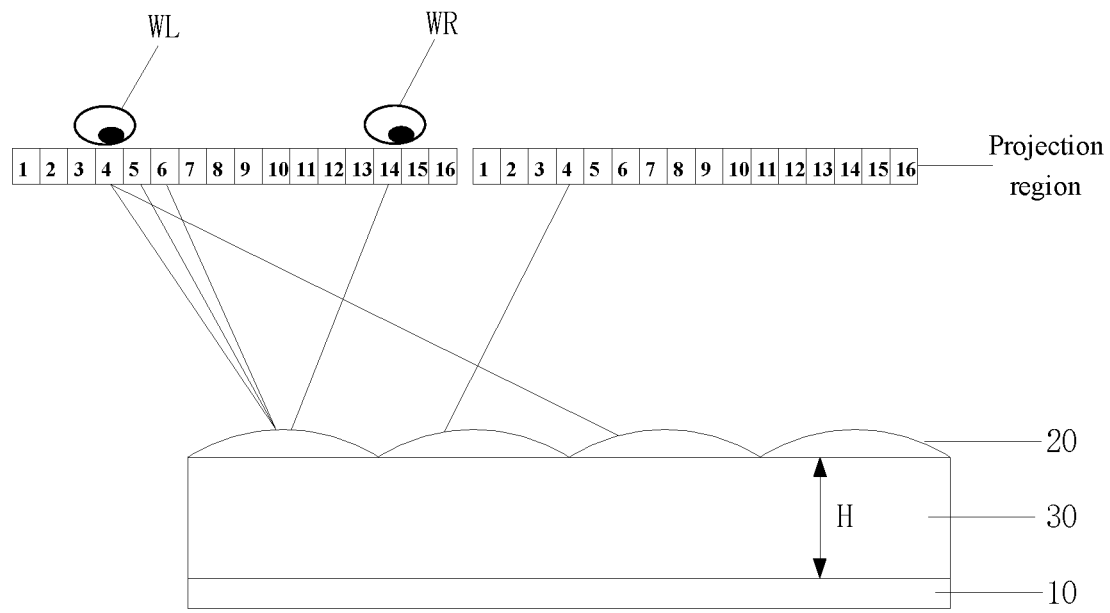
FIG. 1 is a schematic structural diagram of a display device according to an embodiment of the present disclosure.

FIG. 1 is a schematic structural diagram of a display device according to an embodiment of the present disclosure. As shown in FIG. 1, the display device provided in the embodiment of the present disclosure may include a display panel 10 and a light splitting device 20.

Figure 2:
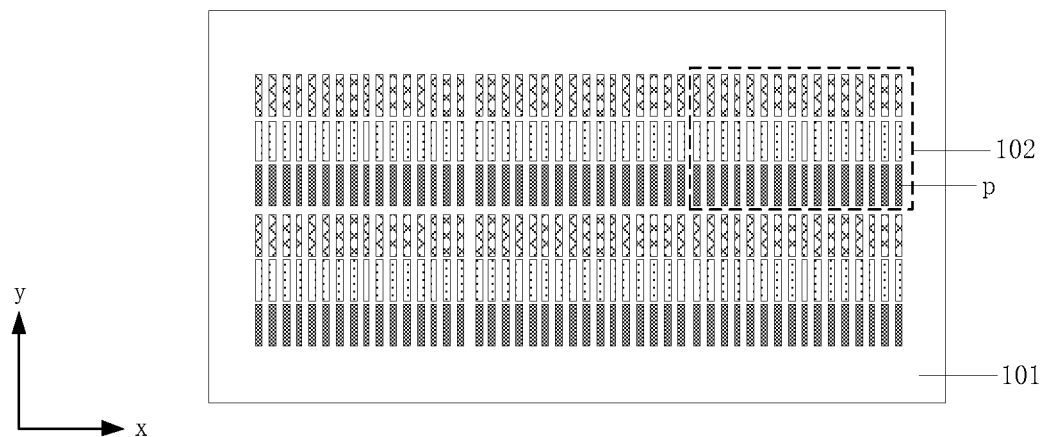
FIG. 2 is a schematic diagram of a plane structure of a display panel according to an embodiment of the present disclosure.
Figure 3:
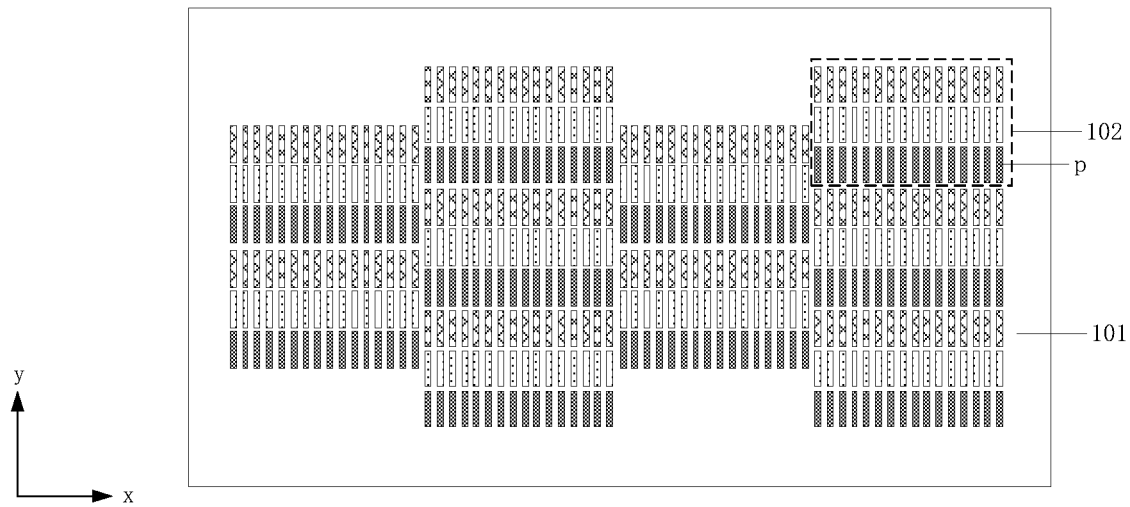
FIG. 3 is a schematic diagram of another plane structure of a display panel according to an embodiment of the present disclosure.

FIG. 2 is a schematic diagram of a plane structure of a display panel according to an embodiment of the present disclosure. In conjunction with FIGS. 1 and 2, the display panel 10 may include a substrate 101, and a plurality of pixel islands 102 on the substrate 101; where each of the pixel islands 102 includes a plurality of sub-pixels p arranged in a first direction x and a second direction y; in each pixel island 102, a row of sub-pixels p arranged in the first direction x have the same color, and a row of sub-pixels p arranged in the second direction y have colors different from each other; and the first direction x and the second direction y intersect with each other. During particular implementation, the pixel islands 102 in the display panel 10 may have the same structure, and the pixel islands 102 may be arranged in an array in the first direction x and the second direction y. FIG. 3 is a schematic diagram of another plane structure of a display panel according to an embodiment of the present disclosure. The pixel islands in the display panel may be arranged in a manner shown in FIG. 2, that is, rows of pixel islands are aligned in the first direction x, and columns of pixel islands are aligned in the second direction y, where a line of pixel islands 102 arranged in the first direction x may be a row of pixel islands, and a line of pixel islands 102 arranged in the second direction y may be a column of pixel islands. Or, the pixel islands in the display panel may be arranged in a manner shown in FIG. 3, that is, rows of pixel islands are aligned in the first direction x, and columns of pixel islands are staggered in the second direction y by a certain distance, for example, the staggered distance may be half a width of each pixel island 102 in the second direction y, which is only illustrative of the distance and does not limit the staggered distance.

The light splitting device 20 is located at a side of a display surface of the display panel 10; where the light splitting device 20 is configured to deflect part of light emitted by the display panel 10 to a first region, and deflect the other part of light emitted by the display panel 10 to a second region. For example, the first region may be a region where a left eye WL is located, and the second region may be a region where a right eye WR is located.

A main lobe angle corresponding to the pixel island 102 in a central display region of the display panel 10 and a pupil distance angle satisfy the following relational expression:

$$\alpha \geq \frac{2}{3} \cdot \beta.$$

where α represents the main lobe angle, and β represents the pupil distance angle; the main lobe angle is a projection angle of light emitted by the pixel island at a viewing position and in the first direction; and the pupil distance angle is an opening angle of two eyes relative to the display panel at the viewing position. The central display region of the display panel may be understood as a region near a geometric center of the display region of the display panel, and the geometric center of the display region is in the central display region.

Figure 4:
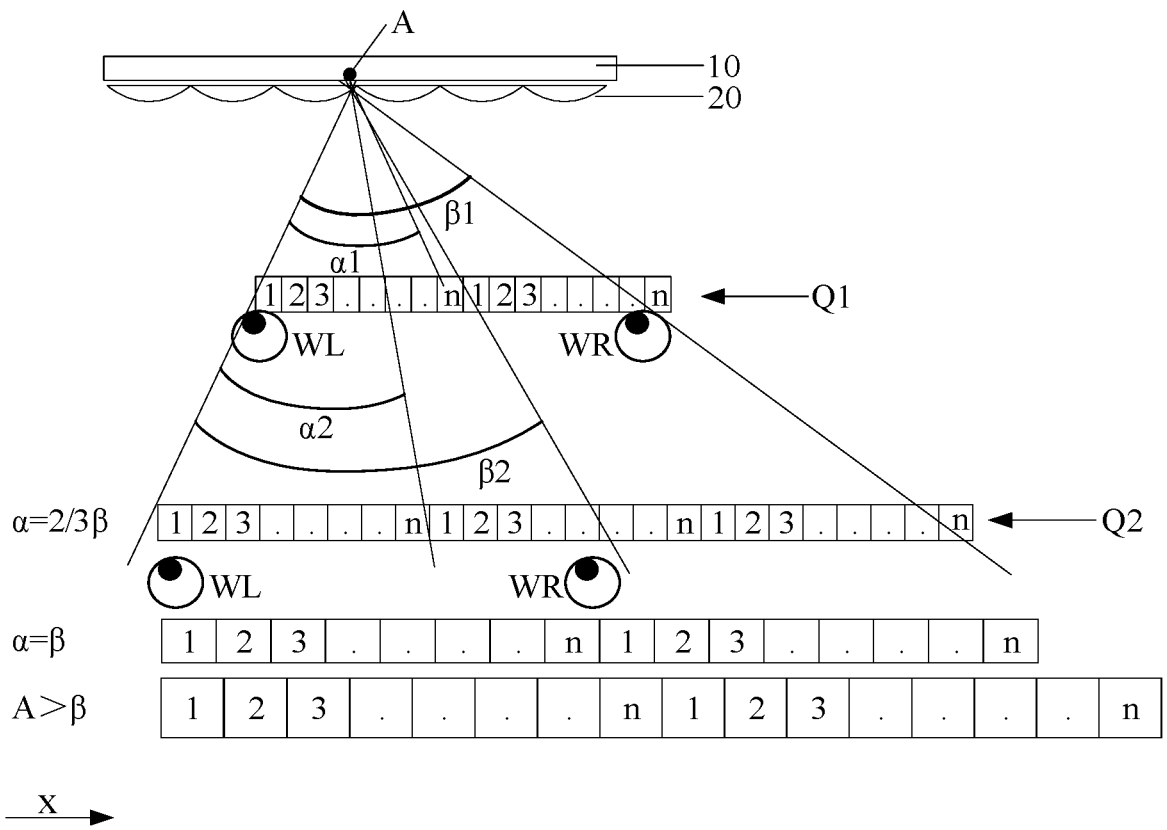
FIG. 4 is a schematic diagram of a corresponding relation between a main lobe angle and a pupil distance angle according to an embodiment of the present disclosure.

FIG. 4 is a schematic diagram of a corresponding relation between a main lobe angle and a pupil distance angle according to an embodiment of the present disclosure. As shown in FIG. 4, a position A is located in the central display region of the display panel 10; boxes 1, 2, 3, ..., n represent a projection region of light emitted by one pixel island at the viewing position; and the main lobe angle is an included angle formed by connecting lines of two ends of the projection region 1, 2, 3, ..., n to the position A separately. A projection angle of light emitted by the pixel island at the position A is α1 at a viewing position Q1 and in the first direction x, that is, a main lobe angle at the viewing position Q1 is α1. A projection angle of light emitted by the pixel island at the position A is α2 at a viewing position Q2 and in the first direction x, that is, a main lobe angle at the viewing position Q2 is α2. The pupil distance angle is an included angle formed by connecting lines of the left eye WL and the right eye WR to the position A at the viewing position separately. The pupil distance angle at the viewing position Q1 is β1, and the pupil distance angle at the viewing position Q2 is β2.

In the display device according to the embodiments of the present disclosure, each pixel island is divided into a plurality of sub-pixels; and after light emitted by a position where each sub-pixel is located passes through the light splitting device, part of light is deflected to a region where the left eye is located, and the other part of light is deflected to a region where the right eye is located. When a user views the display device, the left eye receives a left eye view, the right eye receives a right eye view, and a stereoscopic image is formed through a brain fusion effect, so as to achieve ultra-multi-viewpoint naked-eye 3D display. When the main lobe angle is equal to two-thirds of the pupil distance angle, two eyes of the user do not fall within the projection region corresponding to the same pixel island when the user views the display device at the viewing position, that is to say, the left eye and the right eye of the user do not repeatedly view the same pixel island. Setting the main lobe angle to be greater than or equal to two-thirds of the pupil distance angle may guarantee that the views viewed by the left eye and the right eye of the user are distinguished, so as to prevent the crosstalk between viewing areas of the image displayed by multi-viewpoint naked-eye 3D.

During particular implementation, in order to achieve a better three-dimensional display effect, the display panel may be a display panel with the higher resolution. For example, the display panel may be a liquid crystal display panel, an organic electroluminescent display panel or a micro light-emitting diode display panel. Certainly, the display panel may also be another type of display panel, which is not limited herein. In the display panel, the substrate is typically located at the bottom of the display panel and serves to support and carry other components. A shape and size of the substrate may be adapted to the display panel, and a material of the substrate may be glass or other materials having a supporting function, which is not limited herein.

Alternatively, the light splitting device is a barrier grating, a cylindrical lens or a liquid crystal grating. Certainly, the light splitting device may also be another type of grating, or another optical device capable of light-splitting, which is not limited herein.

Figure 5:
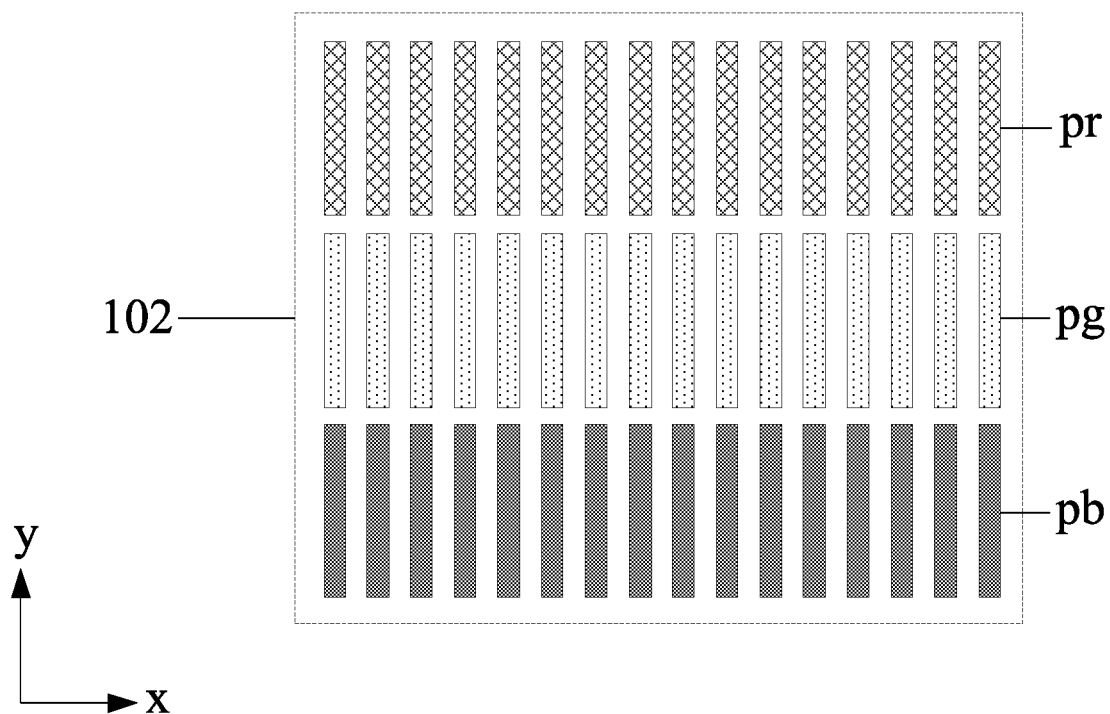
FIG. 5 is a schematic diagram of an arrangement structure of sub-pixels of a pixel island according to an embodiment of the present disclosure.

FIG. 5 is a schematic diagram of an arrangement structure of sub-pixels of a pixel island according to an embodiment of the present disclosure. With reference to FIG. 5, one pixel island 102 may include sub-pixels of three primary colors. For example, the pixel island 102 may include red sub-pixels pr, green sub-pixels pg and blue sub-pixels pb. The number of the red sub-pixels pr, the number of the green sub-pixels pg and the number of the blue sub-pixels pb are the same. The red sub-pixels pr are arranged in a row in the first direction x, the green sub-pixels pg are arranged in a row in the first direction x, and the blue sub-pixels pb are arranged in a row in the first direction x. The red sub-pixel row, the green sub-pixel row and the blue sub-pixel row are arranged in the second direction y, such that the sub-pixels in the pixel island 102 are arranged in an array. Alternatively, the first direction x and the second direction y are perpendicular to each other, where the first direction x is a horizontal direction, and the second direction y is a vertical direction, which are not limited herein.

Furthermore, in the display device according to the embodiment of the present disclosure, with reference to FIG. 4, a main lobe angle corresponding to the pixel island in a central display region of the display panel and a pupil distance angle satisfy the following relational expression:

$$\alpha \leq \frac{3}{2} \cdot \beta.$$

When the main lobe angle is equal to one and half of the pupil distance angle, two eyes of the user fall within the projection region corresponding to the same pixel island when the user views the display device at the viewing position, and the two eyes of the user have a movable space in the projection region. Setting the main lobe angle to be less than or equal to one and half of the pupil distance angle may guarantee that the views viewed by the left eye and the right eye of the user have better continuity.

In conclusion, the main lobe angle corresponding to the pixel island in a central display region of the display panel and the pupil distance angle satisfy the following relational expression:

$$\frac{2}{3} \cdot \beta \leq \alpha \leq \frac{3}{2} \cdot \beta.$$

In this way, the views viewed by the left eye and the right eye may be guaranteed not to have crosstalk, and the views viewed by the left eye and the right eye may be guaranteed to have desirable continuity, so as to improve a display effect of multi-viewpoint naked-eye 3D display.

During particular implementation, in the display device according to the embodiments of the present disclosure, the number of viewpoints corresponding to the pixel island satisfies the following relational expression:

$$\frac{2}{3} \cdot \frac{\beta}{\gamma} \leq n \leq \frac{3}{2} \cdot \frac{\beta}{\gamma}; \text{ and}$$

$$\gamma = 2 \cdot \arctan\left(\frac{d}{2 \cdot L} \cdot \frac{180}{\pi}\right);$$

where n represents the number of viewpoints, γ represents a viewpoint interval angle, and d represents a distance between adjacent viewpoints at the viewing position.

In the embodiments of the present disclosure, the number of viewpoints corresponding to a pixel island is a ratio of a projection region corresponding to the pixel island at the viewing position to a viewpoint interval angle, that is, a ratio of the main lobe angle corresponding to the pixel island to the viewpoint interval angle. By setting the number of viewpoints corresponding to the pixel island in the above range, it may be guarantee that the left eye and the right eye receive the correct views and the crosstalk is low when the user horizontally views the display device at a fixed point at the viewing position.

Herein, the main lobe angle corresponding to the pixel island in the central display region of the display panel and the pupil distance angle further satisfy the relational expression: α=β+γ–k; where k is an integer, and k>2.

The number M of a row of sub-pixels p in the first direction in the pixel island satisfies: M≥n. An aspect ratio K of the size of the pixel island satisfies: K=3/M. Thus, the scale of the three-dimensional image is consistent with that of the two-dimensional image, so as to solve the problem of film source processing of the three-dimensional image.

During specific implementation, the display device according to the embodiments of the present disclosure may further include:
  an eye tracker configured to: detect a position of an eyeball and send detected position information of the eyeball; and
  an image adjuster configured to: receive the position information of the eyeball from the eye tracker, and switch image data of the sub-pixels in the display panel according to the received position information of the eyeball.

In the embodiments of the present disclosure, the eye tracker may be fixed on a side of the display surface of the display panel. When the user views the display panel, the eye tracker may position the positions of human eyes by detecting positions of eyeballs, to determine relative coordinate positions of the human eyes. After receiving position information of the eyeballs sent from the eye tracker, the image adjuster switches image data of sub-pixels in the display panel according to the received position information of the eyeballs, so as to refresh a corresponding left eye view and right eye view. A positioning accuracy range of the eye tracker needs to guarantee a projection width of the sub-pixels in the corresponding pixel islands, and in order to achieve smooth transition of the three-dimensional image, the positioning accuracy range of the eye tracker needs to be less than or equal to 4 mm.

Furthermore, in the above display device according to the embodiments of the present disclosure, as shown in FIG. 1, the display device may further include: a transparent optical film layer 30 located between the display panel 10 and the light splitting device 20.

The transparent optical film layer 30 has a thickness satisfying the following relational expression:

$$H = \frac{Px \cdot L}{T};$$

where H represents the thickness of the transparent optical film layer, Px represents a width of each of the sub-pixels in the first direction, L represents a distance between the viewing position and the light splitting device, and T represents a binocular pupil distance, generally about 4 cm.

In practical applications, the transparent optical film layer 30 may be made of an optical glass or an optical resin material, or other transparent optical materials, which is not limited herein. The thickness of the transparent optical film layer 30 may be adjusted according to the width Px of each sub-pixel in the first direction, the binocular pupil distance T and the distance L between the viewing position and the light splitting device, to obtain a better three-dimensional effect of the display device.

In the above display device according to the embodiments of the present disclosure, each of the pixel islands has a size satisfying the following relational expression:

$$D \leq L \cdot \tan\left(\frac{1}{60} \cdot \frac{\pi}{180}\right);$$

where D represents a width of the pixel island in the first direction.

At the viewing position, if the width of the pixel island in the first direction and an opening angle of the human eyes are less than one arc minute (that is, 1/60°), a three-dimensional image formed by the display device may satisfy the resolution of retinas, such that the retinas of the human eyes may form a three-dimensional image after receiving the left eye view and the right eye view.

Based on the same inventive concept, embodiments of the present disclosure further provide a display method for any one of the display devices. The principle for solving a problem of the display method is similar to that of the display device, such that reference may be made to the embodiments of the display device for the implementation of the display method, which is not repeated herein.

Figure 6:
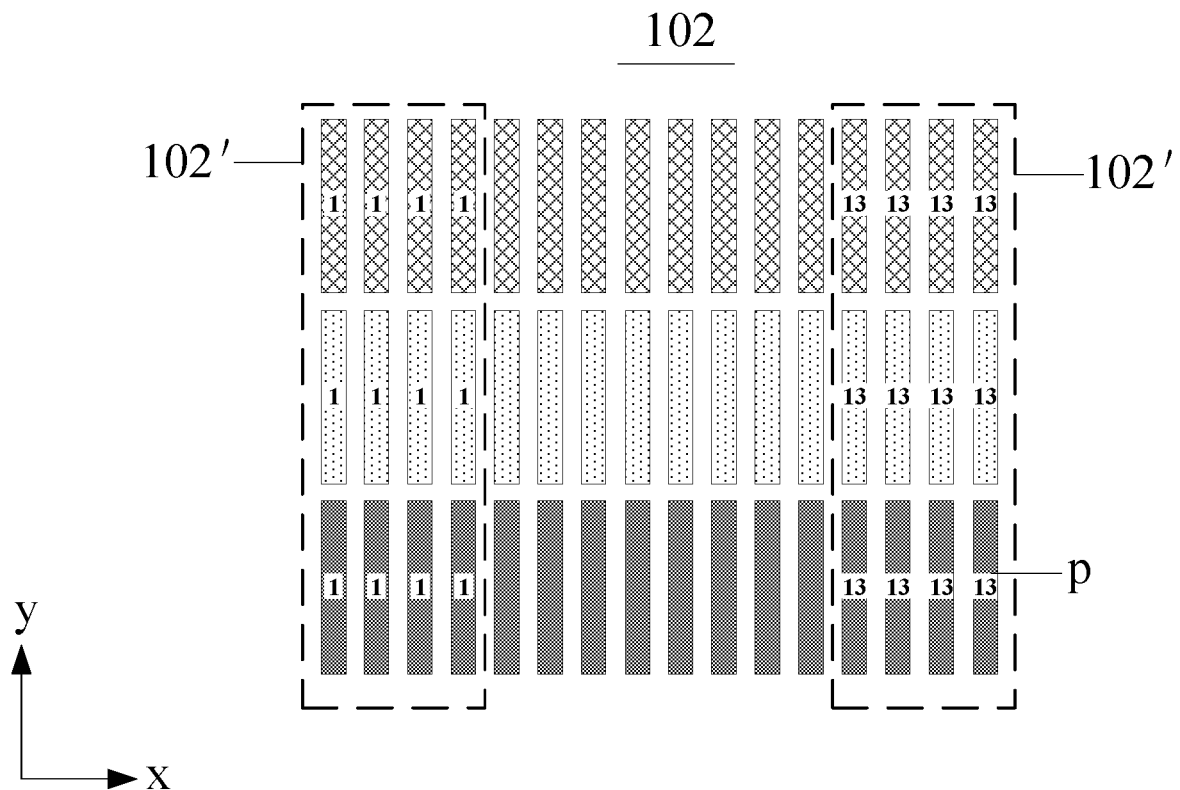
FIG. 6 is another schematic diagram of an arrangement structure of sub-pixels of a pixel island according to an embodiment of the present disclosure.
Figure 7:
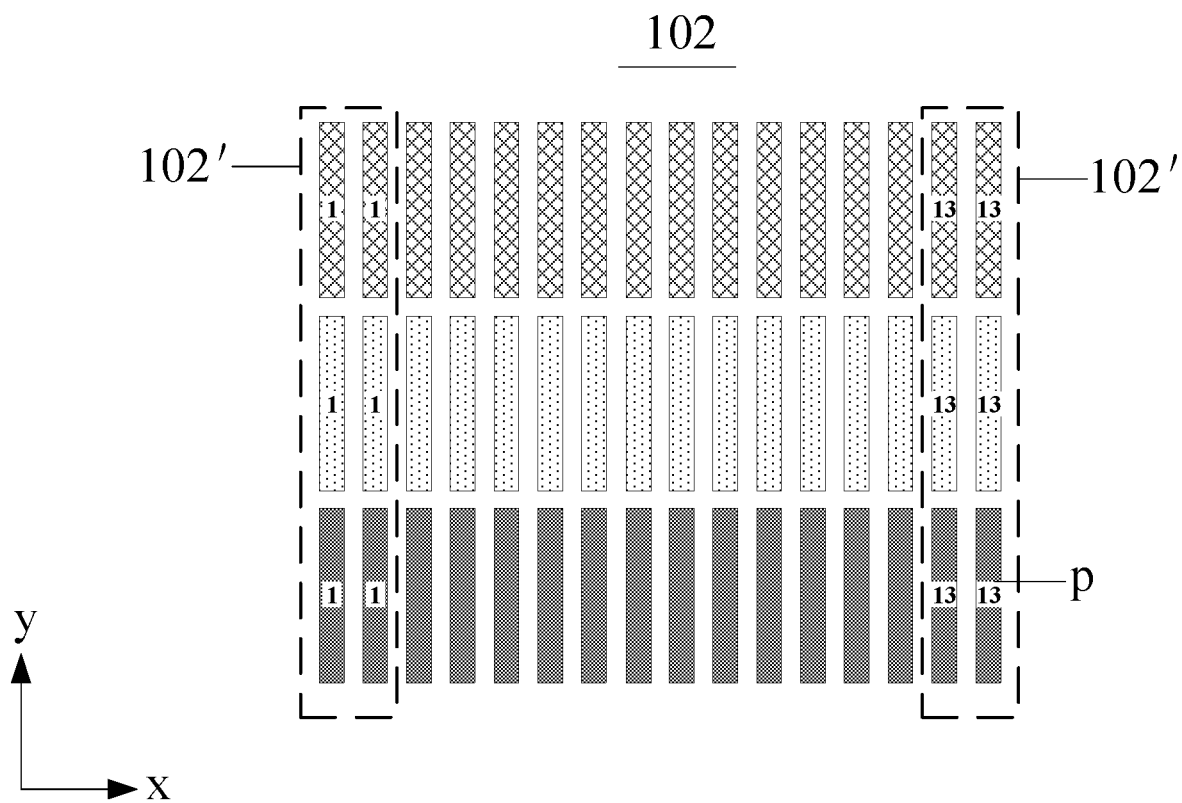
FIG. 7 is yet another schematic diagram of an arrangement structure of sub-pixels of a pixel island according to an embodiment of the present disclosure.

FIG. 6 is another schematic diagram of an arrangement structure of sub-pixels of a pixel island according to an embodiment of the present disclosure; and FIG. 7 is yet another schematic diagram of an arrangement structure of sub-pixels of a pixel island according to an embodiment of the present disclosure. As shown in FIGS. 6 and 7, each of the pixel islands 102 in the display panel includes a plurality of sub-pixel groups 102', and each of the sub-pixel groups 102' includes at least two sub-pixels p adjacent in the first direction x. In FIGS. 6 and 7, with the pixel island 102 including three rows and sixteen columns of sub-pixels as an example, during particular implementation, the number and arrangement of the sub-pixels in the pixel island may be set according to actual requirements, which is not limited herein. In FIG. 6, each sub-pixel group 102' includes four columns of sub-pixels p. In FIG. 7, each sub-pixel group 102' includes two columns of sub-pixels p. In practical applications, the number of sub-pixels in a sub-pixel group may be set according to actual requirements, which is not limited herein. During particular implementation, the number of sub-pixels in each sub-pixel group of the pixel island may be set to be the same, that is, the pixel island is grouped uniformly to obtain a plurality of sub-pixel groups. Moreover, the number of sub-pixels in each sub-pixel group of the pixel island may also be set to be different, which is not limited herein.

Figure 8:
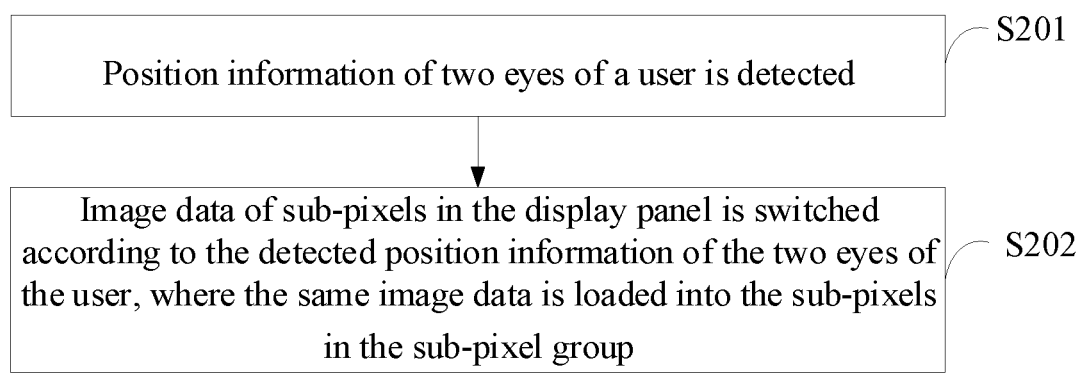
FIG. 8 is a schematic flowchart of a display method according to an embodiment of the present disclosure.

FIG. 8 is a schematic flowchart of a display method according to an embodiment of the present disclosure. As shown in FIG. 8, the display method according to the embodiment of the present disclosure may include the following.

S201, position information of two eyes of a user is detected, for example, an eye tracker may be arranged in the display panel to track position information of eyeballs.

S202, image data of the sub-pixels in the display panel is switched according to the detected position information of the two eyes of the user, where the same image data is loaded into the sub-pixels in the sub-pixel group.

In the display method provided in the embodiments of the present disclosure, by detecting position information of the two eyes of the user, and switching images of the sub-pixels in the display panel according to the detected position information of the two eyes of the user, view information of the left eye and the right eye at corresponding viewing positions is refreshed, and switching of the left eye view and the right eye view may be accurately controlled. Moreover, by loading sub-pixels of the sub-pixel group with the same image data, a data size of a two-dimensional display panel at a single moment is reduced and a data size of three-dimensional data is also reduced, so as to solve the problems of difficulty in driving when using a high-resolution display panel for ultra-multi-viewpoint 3D display, and of huge amount of 2D data transmission at the same moment; and it is favourable to achieve real-time 3D scene reproduction.

Figure 9:
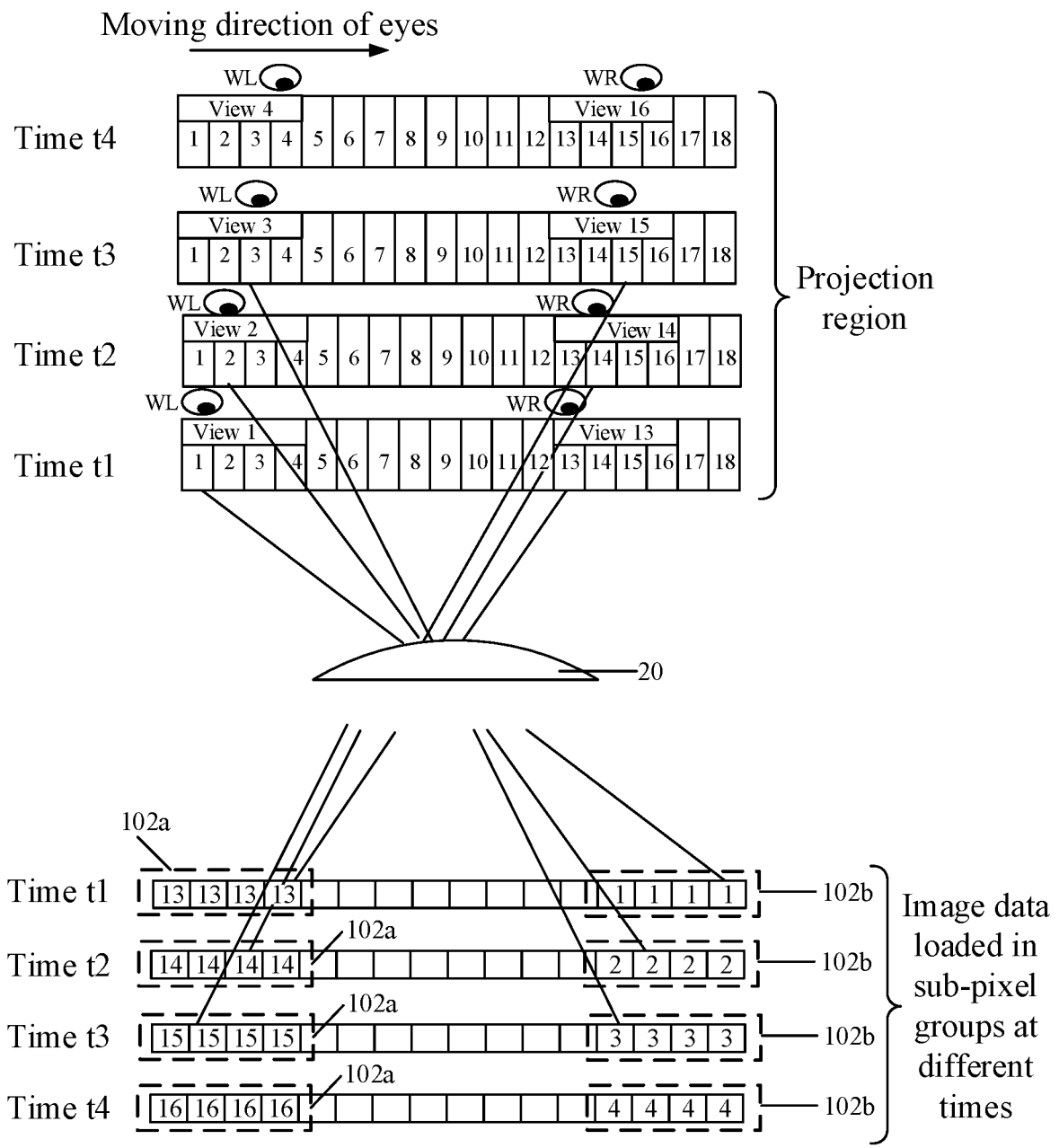
FIG. 9 is a schematic diagram of a corresponding relation between image data loaded in each sub-pixel group and a view viewed by human eyes according to an embodiment of the present disclosure.

FIG. 9 is a schematic diagram of a corresponding relation between image data loaded in each sub-pixel group and a view viewed by human eyes according to an embodiment of the present disclosure. In FIG. 9, a pixel island structure shown in FIG. 6 is taken as an example, that is, each sub-pixel group includes four columns of sub-pixels in FIG. 9. As shown in FIGS. 6 and 9, the two eyes of the user are located at different positions from time t1 to time t4 separately. At time t1, image data of view 13 is input to the sub-pixels in the first sub-pixel group 102a simultaneously, and image data of view 1 is input to the sub-pixels in the second sub-pixel group 102b simultaneously, such that the left eye WL at the projection region receives an image of view 1, and the right eye WR at the projection region receives an image of view 13. At time t2, image data of view 14 is input to the sub-pixels in the first sub-pixel group 102a simultaneously, and image data of view 2 is input to the sub-pixels in the second sub-pixel group 102b simultaneously, such that the left eye WL at the projection region receives an image of view 2, and the right eye WR at the projection region receives an image of view 14. Description of the other times is similar. In this way, only 4 gray scales of image data need to be input to the pixel island at each time; and compared with 16 gray scales being input to sub-pixels in the pixel island, one sub-pixel is multiplexed four times by using time division multiplexing, and the data size input to the pixel island at each time is reduced to 25% of the original data size.

Moreover, display may also be performed in a grouping manner as shown in FIG. 7, that is, two adjacent columns of sub-pixels are used for signal congruence control, such that the data size input to the pixel island at each time is reduced to 50% of the original data size, and the crosstalk between the left eye view and the right eye view may be reduced.

Based on the same inventive concept, embodiments of the present disclosure further provide in a display method for any one of the display devices. The principle for solving a problem of the display method is similar to that of the display device, such that reference may be made to the embodiments of the display device for the implementation of the display method, which is not repeated herein.

Figure 10:
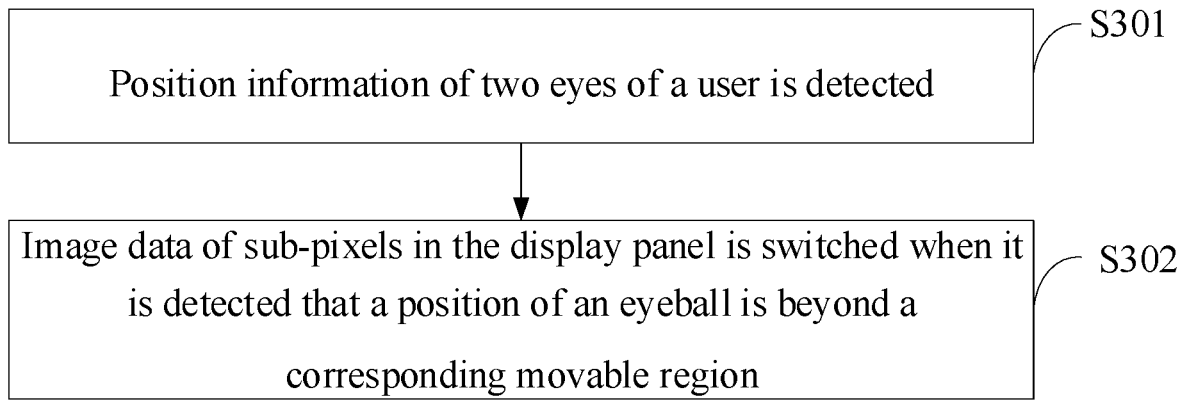
FIG. 10 is a schematic flowchart of a display method according to an embodiment of the present disclosure.

FIG. 10 is a schematic flowchart of a display method according to an embodiment of the present disclosure. As shown in FIG. 10, the display method for any one of the display devices according to the embodiment of the present disclosure may include the following.

S301, position information of two eyes of a user is detected, for example, an eye tracker may be arranged in the display panel to track position information of eyeballs.

S302, image data of sub-pixels in the display panel is switched when it is detected that a position of an eyeball is beyond a corresponding movable region.

The movable region satisfies the following relational expression:

$$\frac{1}{3} \cdot W \leq J \leq \frac{1}{2} \cdot W;$$

where J represents the movable region of the eyeball at a viewing position, and W represents a projection region of light emitted by the pixel island in a central display region of the display panel at the viewing position, that is, a main lobe viewing area, where one main lobe viewing area W corresponds to one main lobe angle $\alpha$.

In the display method provided in the embodiments of the present disclosure, the position information of the two eyes of the user is detected, and the image data of sub-pixels in the display panel is switched when it is detected that the position of the eyeball is beyond the corresponding movable region. Moreover, at each time, viewpoints in the viewing area of the main lobe angle are distributed in the movable regions of the left eye and the right eye. In this way, when the user views the display panel, each eye has a certain movable region during moving; and the same parallax may be obtained when the left eye and the right eye move for viewing in the movable regions. The positioning accuracy of the eye tracker only needs to position the range of the movable region, and does not need to position each viewpoint. During particular implementation, the eye tracker only needs to satisfy ½ of the pupil distance angle to the minimum, that is, the accuracy of the eye tracker only needs to be greater than 1°. Compared with that the accuracy of the eye tracker in the related art at least satisfies the viewpoint interval angle (generally being 0.2°-0.4°, that is, the pupil size), an accuracy requirement for the eye tracker is reduced, the device cost is reduced, and the viewpoint continuity of the three-dimensional display may be ensured.

Figure 11:
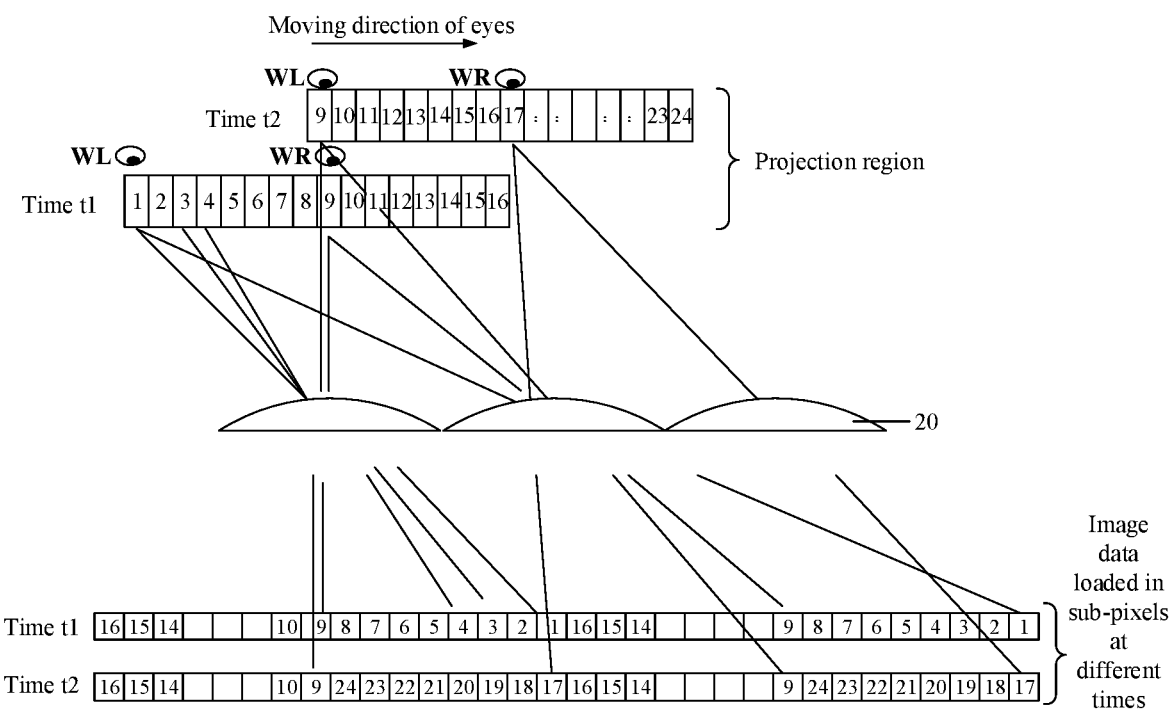
FIG. 11 is a schematic diagram of a display process of a display device according to an embodiment of the present disclosure.

When the main lobe angle satisfies $$\frac{2}{3} \cdot \beta \leq \alpha \leq \beta,$$

for example, $$\alpha = \frac{2}{3} \cdot \beta,$$

and when n viewpoints are distributed in the main lobe viewing area W, the maximum movable region available for the left or right eye is half of the main lobe viewing area W. FIG. 11 is a schematic diagram of a display process of the display device according to an embodiment of the present disclosure. As shown in FIG. 11, the left eye may move between viewpoints 1–n/2, the right eye may move between viewpoints n/2–n, and the left eye and the right eye not only have the minimal crosstalk but may obtain the same parallax during moving. The positioning accuracy of the eye tracker only needs to be minimized to the movable region, that is, the positioning accuracy is half of the main lobe viewing area. When eyes move beyond the movable regions, the eye tracker feeds back position information corresponding to the eyes to the image adjuster, and the image adjuster switches the image data of the sub-pixels to implement entire switching of the multi-viewpoint image, so as to eliminate a 3D image inversion region and achieve continuous viewing of the ultra-multi-space 3D image.

With further reference to FIG. 11, at time t1, image data is loaded to sub-pixels corresponding to viewpoints 1-16, and the viewpoints 1-16 are displayed in the projection region, where the left eye corresponds to the viewpoints 1-8, and the right eye corresponds to the viewpoints 9-16. When the left eye moves in a range of the viewpoints 1-8 and the right eye moves in a range of the viewpoints 9-16, continuous parallax viewing of the left and right eyes may be achieved. At time t2, when the left eye moves to a position of the viewpoint 9, the eye tracker sends the position information of the eyeballs to the image adjuster, and the image adjuster refreshes image data of the sub-pixels corresponding to the viewpoints 9-24 according to the position information of the eyeballs. The viewpoints 9-24 are displayed in the projection region, where the left eye corresponds to the viewpoints 9-16, and the right eye corresponds to the viewpoints 17-24, so as to achieve read-through dense ultra-multi-viewpoint in the horizontal ultra-large space.

When the main lobe angle satisfies $$\beta \le \alpha \le \frac{3}{2} \cdot \beta,$$

for example, $$\alpha = \frac{3}{2} \cdot \beta,$$

and when n viewpoints are distributed in the main lobe viewing area W, the maximum movable region available for the left or right eye is ⅓ of the main lobe viewing area W, the left eye may move between viewpoints 1−(n/3), the right eye may move between viewpoints (2n/3)−n, and the left eye and the right eye not only have the minimal crosstalk but may obtain the same parallax during moving. The positioning accuracy of the eye tracker only needs to be minimized to the movable region, that is, the positioning accuracy is ⅓ of the main lobe viewing area. When eyes move beyond the movable regions, the eye tracker feeds back position information corresponding to the eyes to the image adjuster, and the image adjuster switches the image data of the sub-pixels to implement entire switching of the multi-viewpoint image, so as to eliminate a 3D image inversion region and achieve continuous viewing of the ultra-multi-space 3D image.

Further, the display method according to the embodiments of the present disclosure may further include: loading some sub-pixels in the pixel island with image data corresponding to a left eye, loading some other sub-pixels in the pixel island with image data corresponding to a right eye, and load the remaining sub-pixels in the pixel island with no image data.

In this way, a data size of a two-dimensional display panel is reduced, and a data size of three-dimensional data is also reduced, so as to solve the problems of difficulty in driving when using a high-resolution display panel for ultra-multi-viewpoint 3D display, and of huge amount of 2D data transmission at the same moment; and it is favourable to achieve real-time 3D scene reproduction.

Figure 12:
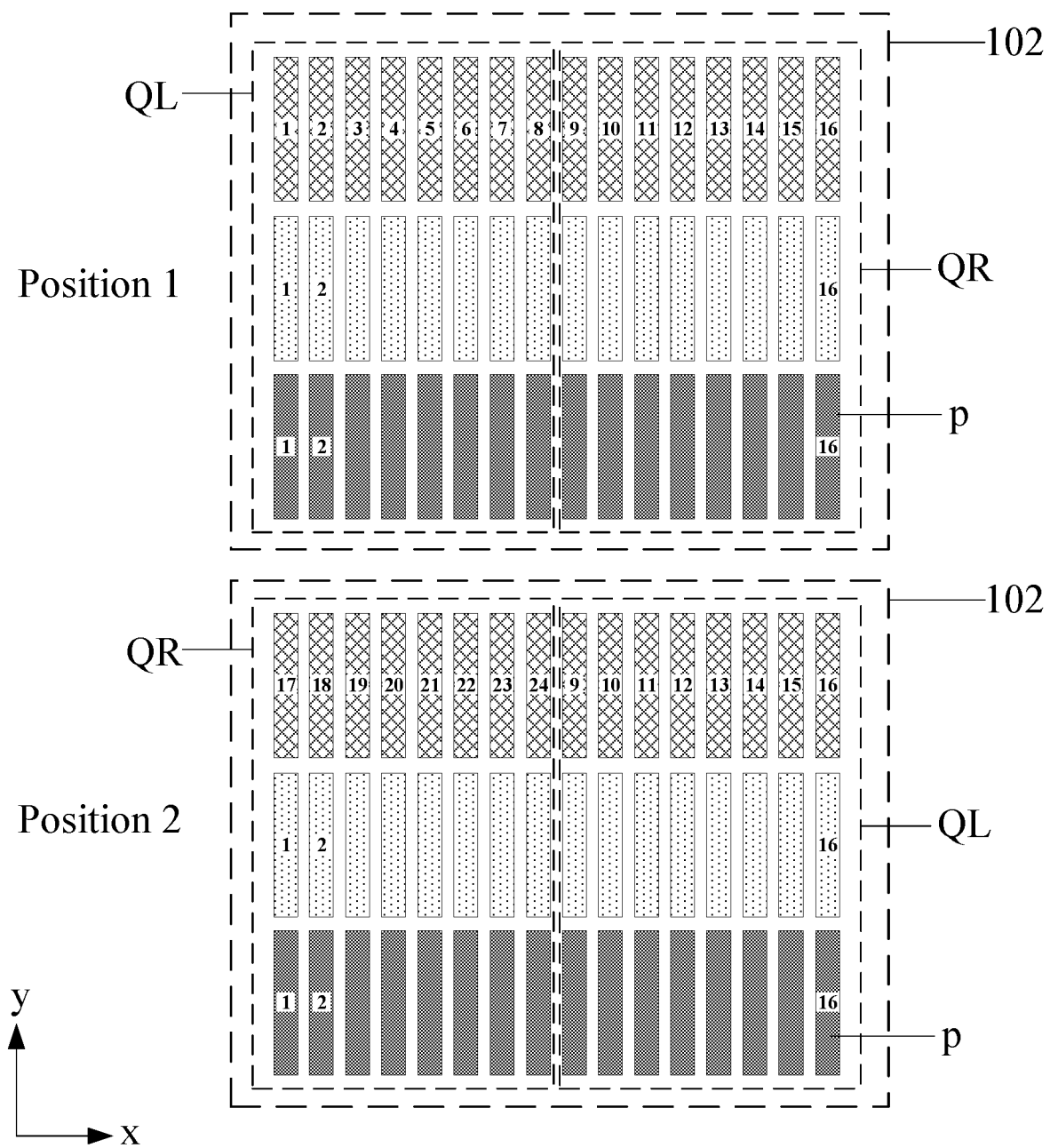
FIG. 12 is a schematic diagram of a full viewpoint image displayed by a pixel island.

FIG. 12 is a schematic diagram of a full viewpoint image displayed by a pixel island. As shown in FIG. 12, QL represents sub-pixels corresponding to a left eye view, and QR represents sub-pixels corresponding to a right eye view. Taking that the main lobe angle satisfies $$\alpha = \frac{2}{3} \cdot \beta,$$

and 16 viewpoints are distributed in the main lobe viewing area as an example, at position 1, the left eye corresponds to the viewpoints 1-8, and the right eye corresponds to the viewpoints 9-16 in the pixel island; and at position 2, the left eye corresponds to the viewpoints 9-16, and the right eye corresponds to viewpoints 17-24.

Figure 13:
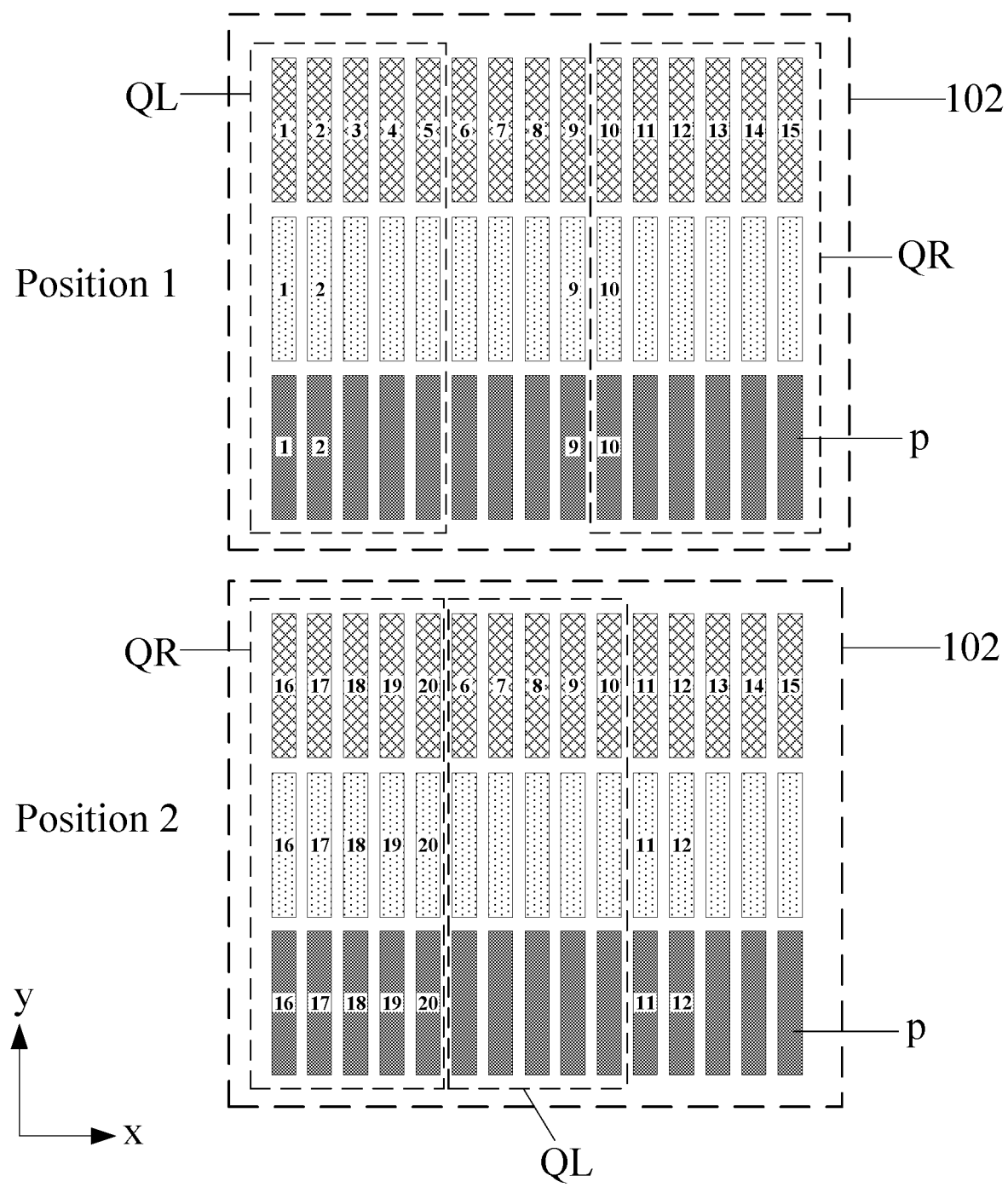
FIG. 13 is a schematic diagram of a partial viewpoint image displayed by a pixel island.

FIG. 13 is a schematic diagram of a partial viewpoint image displayed by a pixel island. As shown in FIG. 13, QL represents sub-pixels corresponding to a left eye view, and QR represents sub-pixels corresponding to a right eye view. Taking that the main lobe angle satisfies $$\alpha = \frac{3}{2} \cdot \beta,$$

and 15 viewpoints are distributed in the main lobe viewing area as an example, at position 1, the left eye corresponds to the viewpoints 1-5, the right eye corresponds to the viewpoints 10-15, and signals at the viewpoints 6-9 may be closed in the pixel island; and at position 2, the left eye corresponds to the viewpoint 6-10, the right eye corresponds to the viewpoints 16-20, and signals at the viewpoints 11-15 may be closed. Compared with the display process shown in FIG. 12, the display process shown in FIG. 13 may reduce the 3D data size input at each time to ⅔ of that during full driving.

While the preferred embodiments of the present disclosure have been described, additional alterations and modifications to those embodiments may be made by those skilled in the art once the basic inventive concept is apparent to those skilled in the art. Thus, it is intended that the appended claims are to be interpreted to include the preferred embodiments and all alterations and modifications that fall within the scope of the present disclosure.

It will be apparent to those skilled in the art that various modifications and variations can be made to the embodiments of the present disclosure without departing from the spirit and scope of the embodiments of the present disclosure. Thus, if modifications and variations to the embodiments of the present disclosure fall within the scope of the appended claims of the present disclosure and their equivalents, it is intended that the present disclosure encompass such modifications and variations as well.

What is claimed is:

1. A display device, comprising:
a display panel comprises a substrate, and a plurality of pixel islands on the substrate;
wherein each of the plurality of pixel islands comprises a plurality of sub-pixels arranged in a first direction and a second direction; in each of the plurality of the pixel islands, a row of sub-pixels arranged in the first direction have a same color, and a row of sub-pixels arranged in the second direction have colors different from each other; and the first direction and the second direction intersect with each other; and
a light splitting device at a side of a display surface of the display panel; wherein the light splitting device is configured to deflect part of light emitted by the display panel to a first region, and deflect other part of light emitted by the display panel to a second region;
wherein a main lobe angle corresponding to the pixel island in a central display region of the display panel and a pupil distance angle satisfy a following relational expression:

$$\alpha \geq \frac{2}{3} \cdot \beta,$$

wherein $\alpha$ represents the main lobe angle, and $\beta$ represents the pupil distance angle; the main lobe angle is a projection angle of light emitted by the pixel island at a viewing position and in the first direction; and the pupil distance angle is an opening angle of two eyes relative to the display panel at the viewing position.

2. The display device according to claim 1, wherein the main lobe angle corresponding to the pixel island in the central display region of the display panel and the pupil distance angle satisfy a following relational expression:

$$\alpha \leq \frac{3}{2} \cdot \beta.$$

3. The display device according to claim 2, wherein a quantity of viewpoints corresponding to the pixel island satisfies a following relational expression:

$$\frac{2}{3} \cdot \frac{\beta}{\gamma} \leq n \leq \frac{3}{2} \cdot \frac{\beta}{\gamma}; \text{ and}$$

$$\gamma = 2 \cdot \arctan\left(\frac{d}{2 \cdot L} \cdot \frac{180}{\pi}\right);$$

wherein n represents the quantity of viewpoints, $\gamma$ represents a viewpoint interval angle, and d represents a distance between adjacent viewpoints at the viewing position.

4. The display device according to claim 2, further comprising:
an eye tracker configured to: detect a position of an eyeball and send detected position information of the eyeball; and
an image adjuster configured to: receive the position information of the eyeball from the eye tracker, and switch image data of the plurality of sub-pixels in the display panel according to the received position information of the eyeball.

5. The display device according to claim 1, further comprising: a transparent optical film layer between the display panel and the light splitting device;
wherein the transparent optical film layer has a thickness satisfying a following relational expression:

$$H = \frac{Px \cdot L}{T};$$

wherein H represents the thickness of the transparent optical film layer, Px represents a width of each of the plurality of sub-pixels in the first direction, L represents a distance between the viewing position and the light splitting device, and T represents a binocular pupil distance.

6. The display device according to claim 1, wherein each of the plurality of pixel islands has a size satisfying a following relational expression:

$$D \leq L \cdot \tan\left(\frac{1}{60} \cdot \frac{\pi}{180}\right);$$

wherein D represents a width of the pixel island in the first direction.

7. The display device according to claim 1, wherein the light splitting device is a barrier grating, a cylindrical lens or a liquid crystal grating.

8. A display method for the display device according to claim 1, wherein each of plurality of pixel islands in the display panel comprises a plurality of sub-pixel groups, and each of the plurality of sub-pixel groups comprises at least two sub-pixels adjacent in the first direction;
wherein the display method comprises:
detecting position information of two eyes of a user; and
switching image data of the plurality of sub-pixels in the display panel according to the detected position information of the two eyes of the user, wherein same image data is loaded into the at least two sub-pixels in the sub-pixel group.

9. A display method for the display device according to claim 1, comprising:
detecting position information of two eyes of a user; and
switching image data of the plurality of sub-pixels in the display panel when it is detected that a position of an eyeball is beyond a corresponding movable region;
wherein the movable region satisfies a following relational expression:

$$\frac{1}{3} \cdot W \leq J \leq \frac{1}{2} \cdot W;$$

wherein J represents the movable region of the eyeball at the viewing position, and W represents a projection region of light emitted by the pixel island in the central display region of the display panel at the viewing position.

10. The display method according to claim 9, further comprising:
loading some sub-pixels in the pixel island with image data corresponding to a left eye, loading some other sub-pixels in the pixel island with image data corresponding to a right eye, and loading remaining sub-pixels in the pixel island with no image data.

* * * * *